(12) United States Patent
Cepeda

(10) Patent No.: US 11,814,114 B2
(45) Date of Patent: Nov. 14, 2023

(54) TIRE TOOL MOUNT ASSEMBLY

(71) Applicant: Eduardo Cepeda, Rancho Viejo, TX (US)

(72) Inventor: Eduardo Cepeda, Rancho Viejo, TX (US)

( * ) Notice: Subject to any disclaimer, the term of this patent is extended or adjusted under 35 U.S.C. 154(b) by 0 days.

(21) Appl. No.: 17/236,869

(22) Filed: Apr. 21, 2021

(65) Prior Publication Data

US 2022/0340214 A1   Oct. 27, 2022

(51) Int. Cl.
*B62D 43/02* (2006.01)
*B62D 43/00* (2006.01)

(52) U.S. Cl.
CPC ........... *B62D 43/02* (2013.01); *B62D 43/002* (2013.01)

(58) Field of Classification Search
CPC ....... B62D 43/00; B62D 43/02; B62D 43/002
USPC ............................. 224/42.12–42.3
See application file for complete search history.

(56) References Cited

U.S. PATENT DOCUMENTS

| | | | | |
|---|---|---|---|---|
| 971,768 A * | 10/1910 | Martin | .................... | B65D 85/06 224/42.2 |
| 1,043,752 A * | 11/1912 | Bolz | .................... | B62D 43/02 224/42.14 |
| 1,186,073 A * | 6/1916 | Brown | .................... | B60R 9/06 206/304 |
| 1,244,417 A * | 10/1917 | Brosman | .................... | B65D 85/06 224/42.2 |
| 2,377,149 A * | 5/1945 | Heil | .................... | B62D 43/002 414/463 |
| 3,442,408 A * | 5/1969 | Kost | .................... | B62D 43/02 414/463 |
| 3,880,335 A * | 4/1975 | Winkler | .................... | B62D 43/00 224/555 |
| 2005/0155994 A1* | 7/2005 | Larson | .................... | B62D 43/02 224/42.29 |
| 2005/0160804 A1* | 7/2005 | Brown | .................... | B60C 23/06 73/146 |
| 2006/0261566 A1* | 11/2006 | Mulvihill | .................... | B62B 1/26 280/47.131 |
| 2009/0267365 A1* | 10/2009 | Puppini | .................... | B62D 43/002 293/118 |
| 2016/0288776 A1* | 10/2016 | Dominguez | .................... | B60S 9/12 |
| 2018/0029656 A1* | 2/2018 | Barnes | .................... | B60N 3/16 |

FOREIGN PATENT DOCUMENTS

KR   2002048037 A  *  6/2002 ............. B62D 43/02

* cited by examiner

*Primary Examiner* — Scott T Mcnurlen
(74) *Attorney, Agent, or Firm* — Law Office of Jeff Williams PLLC; J. Oliver Williams

(57) ABSTRACT

A tire storage device includes a base plate, a frame, and a storage container. The base plate secures the device to the frame of a semi-truck behind the cab. The storage container is also coupled to the base plate and includes a door and latch to provide selective access to an internal volume for the storage and access of tools used to facilitate changing tires on the truck. The frame supports one or more wheels. A lifting mechanism is included to raise and lower the wheels to and from the ground. A motor is selectively operated to facilitate movement. A guard is optionally included to maintain hoses at safe distances from the storage device.

12 Claims, 5 Drawing Sheets

TIRE TOOL MOUNT ASSEMBLY

BACKGROUND OF THE INVENTION

1. Field of the Invention

The present application relates to an assistive tire storage device, and more particularly to a ready mounted tire rack and storage unit for use in semi-trucks.

2. Description of Related Art

Commercial trucks, especially the semi-trucks travel many miles on the roadways. They commonly have 18 wheels and carry large loads. The drivers are under time constraints for each trip and try to make the best time possible. Lost time on the road results in less revenue and less free time off work. A way to increase efficiency of their travel is desired.

It is common for semi-trucks to have issues on the road resulting from a blown or flat tire. Currently semi-trucks carry a spare tire without the rim. These can be carried in different locations but it is not uncommon to see them in a cradle under the tractor trailer. At times the semi-truck itself will carry a spare tire as well. If a flat or blowout occurs, the driver has to call for roadside assistance to change the tire. This involves the blown tire being taken off the rim and replaced with the spare tire on the semi-truck or the trailer. The wheel is then replaced in its position. This take a lot of time to wait for assistance and the process of changing the tire on the rim is also more time consuming.

Although strides have been made with respect to the transportation industry, shortcomings remain. A better means of storage for replacement wheels, including the tire and the wheel rim, are needed. Additionally, an efficient manner of storage for one or more tires and the parts to allow a driver to replace tires themselves would allow increased efficiency.

BRIEF SUMMARY OF THE INVENTION

It is an object of the present application to provide an assistive tire storage device for semi-trucks. The device includes one or more tires nestled into an efficient storage structure having at least one compartment for containing assorted tools. The wheels include the rim and the tire combined, already inflated. The tools are those which are necessary to change the tires on a semi-truck and tractor trailer.

It is another object of the present application to provide the tire storage device as a method to increase efficiencies in the transportation industry. When repairs are needed, the operator is quickly able to respond and get the semi-truck back on the road without having to delay waiting on roadside assistance.

Another object of the present application is to compactly locate the storage container for the tools alongside the tire rack which is configured to hold one or more tires. The tires are nestled into a side of the storage container and are all located rear of the cab and secured to the frame.

Another object is to provide a lifting mechanism coupled to a frame of the assistive tire storage device. The lifting mechanism is configured to selectively raise and lower the wheel on and off the vehicle. Furthermore, grab handles are located on each end of the frame to assist the operator with getting onto and off the vehicle.

Ultimately the invention may take many embodiments. In these ways, the present invention overcomes the disadvantages inherent in the prior art. The more important features have thus been outlined in order that the more detailed description that follows may be better understood and to ensure that the present contribution to the art is appreciated. Additional features will be described hereinafter and will form the subject matter of the claims that follow.

Many objects of the present application will appear from the following description and appended claims, reference being made to the accompanying drawings forming a part of this specification wherein like reference characters designate corresponding parts in the several views.

Before explaining at least one embodiment of the present invention in detail, it is to be understood that the embodiments are not limited in its application to the details of construction and the arrangements of the components set forth in the following description or illustrated in the drawings. The embodiments are capable of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the various purposes of the present design. It is important, therefore, that the claims be regarded as including such equivalent constructions insofar as they do not depart from the spirit and scope of the present application.

BRIEF DESCRIPTION OF THE DRAWINGS

The novel features believed characteristic of the application are set forth in the appended claims. However, the application itself, as well as a preferred mode of use, and further objectives and advantages thereof, will best be understood by reference to the following detailed description when read in conjunction with the accompanying drawings, wherein:

Figure 1:
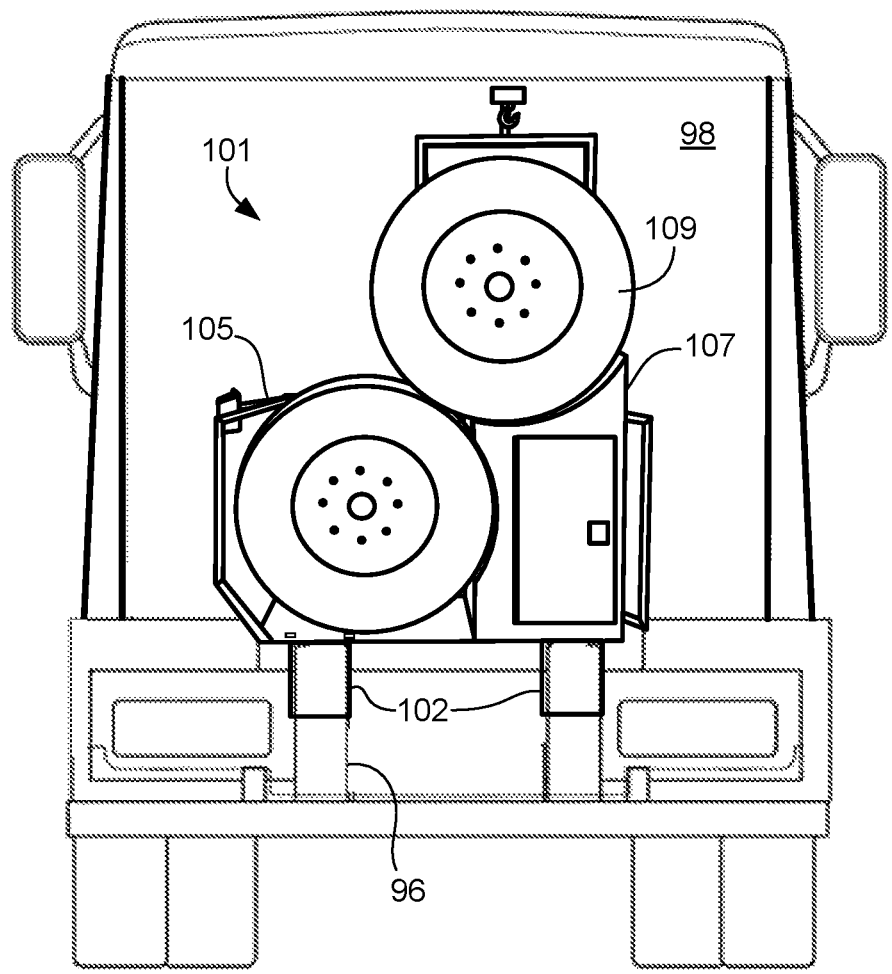
FIG. 1 is a front view of a tire storage device according to an embodiment of the present application.

While the embodiments and method of the present application is susceptible to various modifications and alternative forms, specific embodiments thereof have been shown by way of example in the drawings and are herein described in detail. It should be understood, however, that the description herein of specific embodiments is not intended to limit the application to the particular embodiment disclosed, but on the contrary, the intention is to cover all modifications, equivalents, and alternatives falling within the spirit and scope of the process of the present application as defined by the appended claims.

DETAILED DESCRIPTION OF THE INVENTION

Illustrative embodiments of the preferred embodiment are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms to describe a spatial relationship between various components or to describe the spatial orientation of aspects of such components should be understood to describe a relative relationship between the components or a spatial orientation of aspects of such components, respectively, as the embodiments described herein may be oriented in any desired direction.

The embodiments and method in accordance with the present application overcomes one or more of the above-discussed problems commonly associated with the prior art discussed previously. In particular, the tire storage device is configured to provide an operator a compact and efficient storage unit for one or more wheels along with tools required to facilitate the interchanging of wheels from the semi-truck and/or tractor trailer. The wheels are inclusive of the tire and the rim and are stored for quick interchanging. The wheels are nestled into the storage container to minimize external space required for storage behind the cab. A lifting mechanism is included to facilitate moving the wheel onto and off of the vehicle.

The embodiments and method will be understood, both as to its structure and operation, from the accompanying drawings, taken in conjunction with the accompanying description. Several embodiments of the assembly may be presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless otherwise described.

Referring now to the Figures wherein like reference characters identify corresponding or similar elements in form and function throughout the several views. The following Figures describe embodiments of the present application and its associated features. With reference now to the Figures, embodiments of the present application are herein described. It should be noted that the articles "a", "an", and "the", as used in this specification, include plural referents unless the content clearly dictates otherwise.

Figure 2:
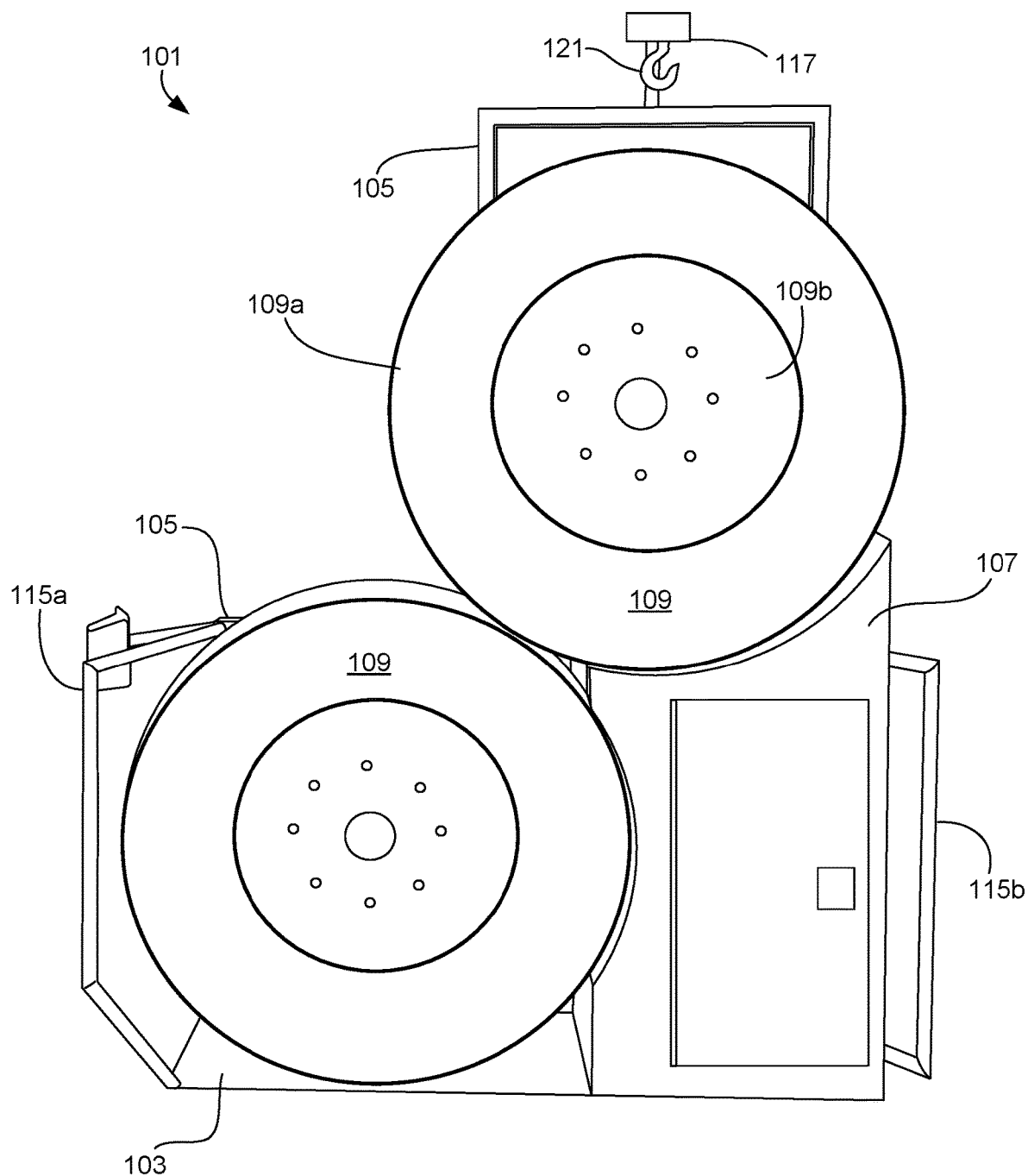
FIG. 2 is an enlarged front view of the tire storage device of FIG. 1.
Figure 3:
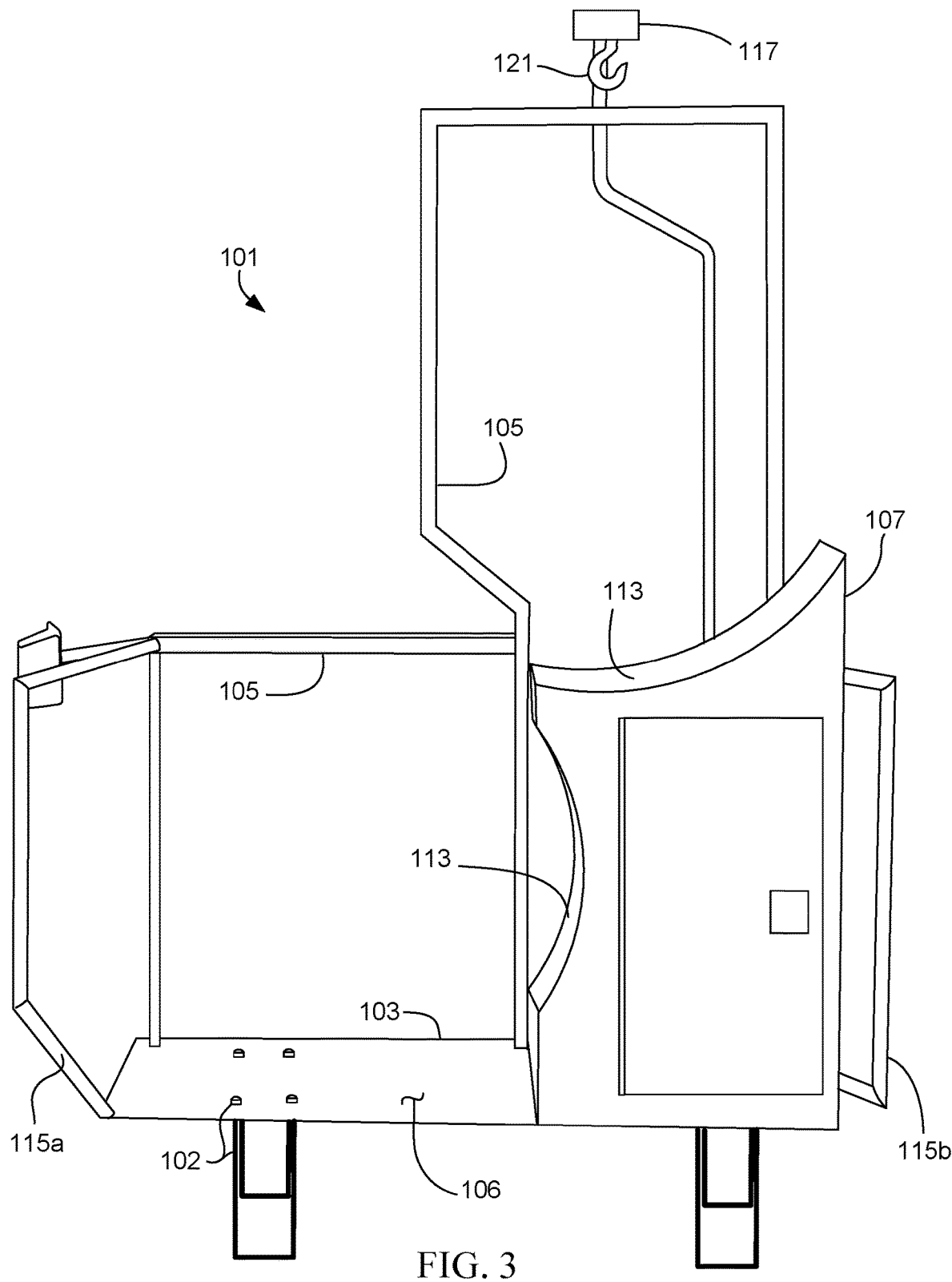
FIG. 3 is an alternate front view of the tire storage device of FIG. 2 without wheels.

Referring now to FIGS. 1-3 in the drawings, front views of tire storage device 101 is illustrated. Device 101 is configured to store one or more wheels for a semi-truck behind cab 98 as seen in FIG. 1. The semi-truck includes a frame 96 in which cab 98 rides on. Device 101 is securely fastened to frame 96 via fasteners 102 which engage frame 96 and pass through a portion of a base plate 103. The wheels 109 are secured in combination with a storage container 107 configured to house tools associated in the task of changing a tire on the truck. It is understood that device 101 may include the wheels or be provided without the wheels as a whole system. Base plate 103 is configured to rest above frame 96. Device 101 is designed to remain below the top of cab 98 in preferred configurations. In the event of a flat tire, the vehicle operator is able to quickly and efficiently lower a wheel, fully inflated, and replace the flat tire. This helps the operator maintain the delivery schedule and save money on having to pay for road side assistance. It is understood that the wheels may be the same or different, different in that perhaps one wheel is for a drive tire (i.e. front wheels) and the other is a re-tread used for the trailer.

As seen in FIG. 2, device 101 includes a base plate 103, a frame 105, and a storage container 107. Base plate 103 is a hardened plate that is configured to spread across a prescribed width so as to overlap both frame rails of frame 96. Base plate 103 includes one or more apertures to facilitate securement to frame 96. The apertures may be oriented anywhere along upper surface 106. On or more fasteners 102 may be used to pass around and/or through frame 96 and engage the apertures. It is understood that various methods of securement between plate 103 and frame 96 is conceivable. Base plate 103 may be made from any hard material but steel is most likely a preferred option. Device 101 is removable and able to be installed on any large vehicle behind the cab 98. It is streamlined in its shape such that it fits fairly flush up against the cab 98 without inhibiting any functions of the tractor trailer set up.

As seen also in FIG. 3, an enlarged front perspective view of device 101 is shown. Device 101 is shown without wheels 109 here in order to provide more clarity to other parts of device 101. Frame 105 is coupled to upper surface 106 and is configured to secure the one or more wheels 109. The wheels 109 are inclusive of both the tire 109a and the wheel 109b. The tires are mounted on the rim ready for use. Either wheel may be selectively removed without affecting the other. Each wheel is secured in their position with one or more straps 110 (see FIG. 5).

Frame 105 is coupled to upper surface 106 and extends upward. Wheels 109 are set in a particular orientation relative to device 101 to enable efficient storage. One manner is shown in the Figures but it is recognized that other designs are possible. In the Figures, wheels 109 are nestled into portions of storage container 107. Container 107 is configured to include one or more concaved surfaces 113. The concave surfaces 113 are configured to pass around a portion of each wheel 109 and act to assist in stabilizing the wheels in place. It is understood that the size, location, and ultimately the inclusion of concave surfaces 113 are variable or optional depending on design needs. A first wheel is elevated above container 107 such that it rests on surface 113. A second wheel rests adjacent to a side of container 107 within a secondary surface 113. The wheels 109 are oriented to rest within the same plane.

Frame 105 extends around container 107, above base plate 103 and behind wheels 109. Various rods of material are secured in place to provide support for wheels 109. As seen in particular with FIG. 2 in the drawings, frame 105 includes handles 115a and 115b which extend outward from base plate 103 and container 107 laterally. These handles are useful in acting as an aid to an operator to lift himself/herself up and down from frame 96.

Figure 4:
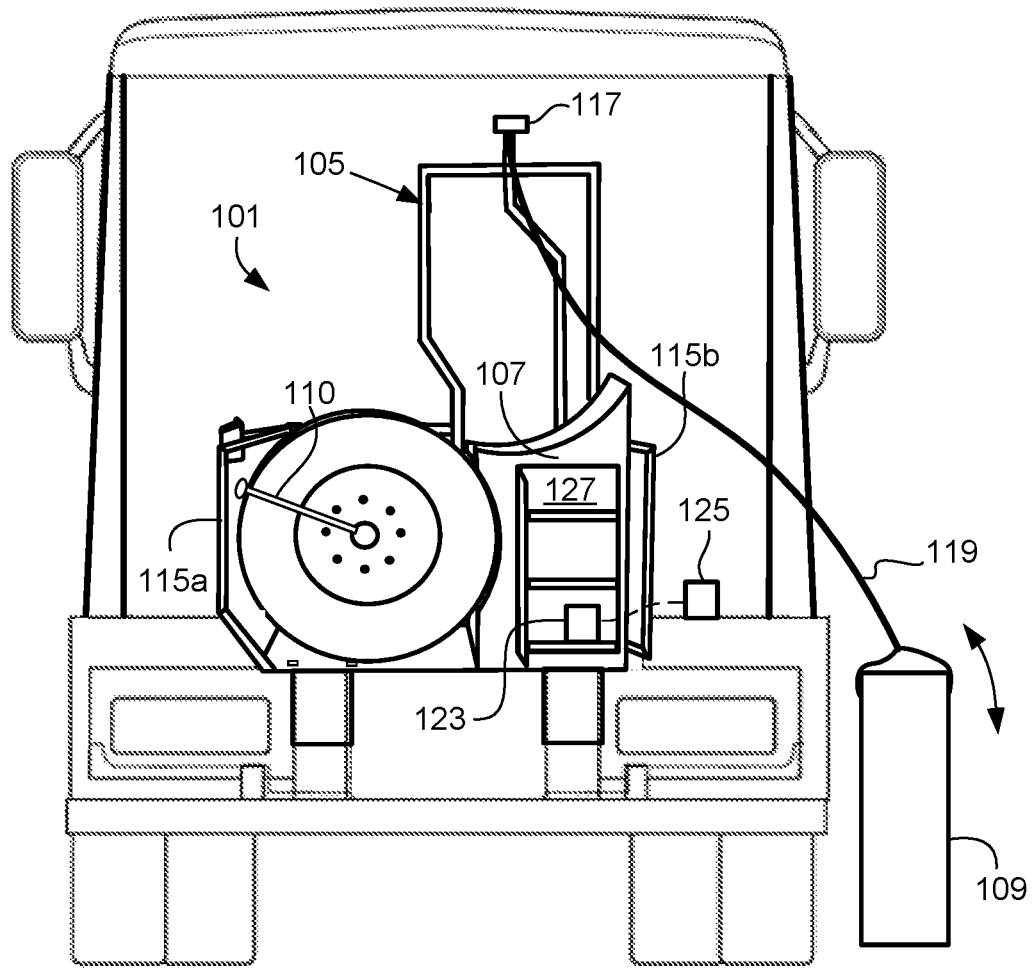
FIG. 4 is a front view of the tire storage device of FIG. 1 in operation.

Referring now also to FIG. 4 in the drawings, a front view of device 101 is illustrated during operation. Device 101 also includes a lifting mechanism 117 coupled to frame 105. Mechanism 117 is configured to grasp either wheel 109 and facilitate its removal from device 101. Mechanism 117 will selectively lower a wheel down from the truck to the ground and also raise a wheel from the ground up into device 101. The wheels 109 are heavy and unable to be handled by operators typically. Mechanism 117 includes a tether 119, a fastener 121, and a motor 123. Fastener 121 is coupled to a first end of tether 119. A second end of tether 119 is in communication with motor 123. Tether 119 passes along frame 105, such as down through conduit 122, and to motor 123.

Motor 123 is not restricted to any particular location; however, it is convenient to locate motor 123 within storage container 107. Motor 123 selectively releases and gathers tether 119 so as to allow wheel 109 to lower and raise. As seen in FIG. 4, wheel 109 is tied to tether 119 adjacent the ground. Motor 123 can be regulated so as to lower or raise wheel 109. An operator may regulate performance of motor 123 through a remote 125 which may be in wired or wireless communication with motor 123. Necessary power sources may be provided through the vehicle or through auxiliary power supplies independent of the vehicle.

Container 107 is coupled to upper surface 106 of base plate 103 and defines an interior volume 127 for the storage of items. As noted above, one such item may be motor 123. The items may include a jack, wrenches, pneumatic tools, gauges, and so forth. Door 129 is configured to be opened and closed to permit access into internal volume 127. A latch 131 may be included to regulate opening and closing of door 129.

Storage container 107 has an internal volume 111 and a door 113. In operation, an operator may quickly remove a wheel 109 and access tools within container 107 to facilitate a tire change. The old rim and tire may be placed on frame 105 in place of the other tire.

Figure 5:
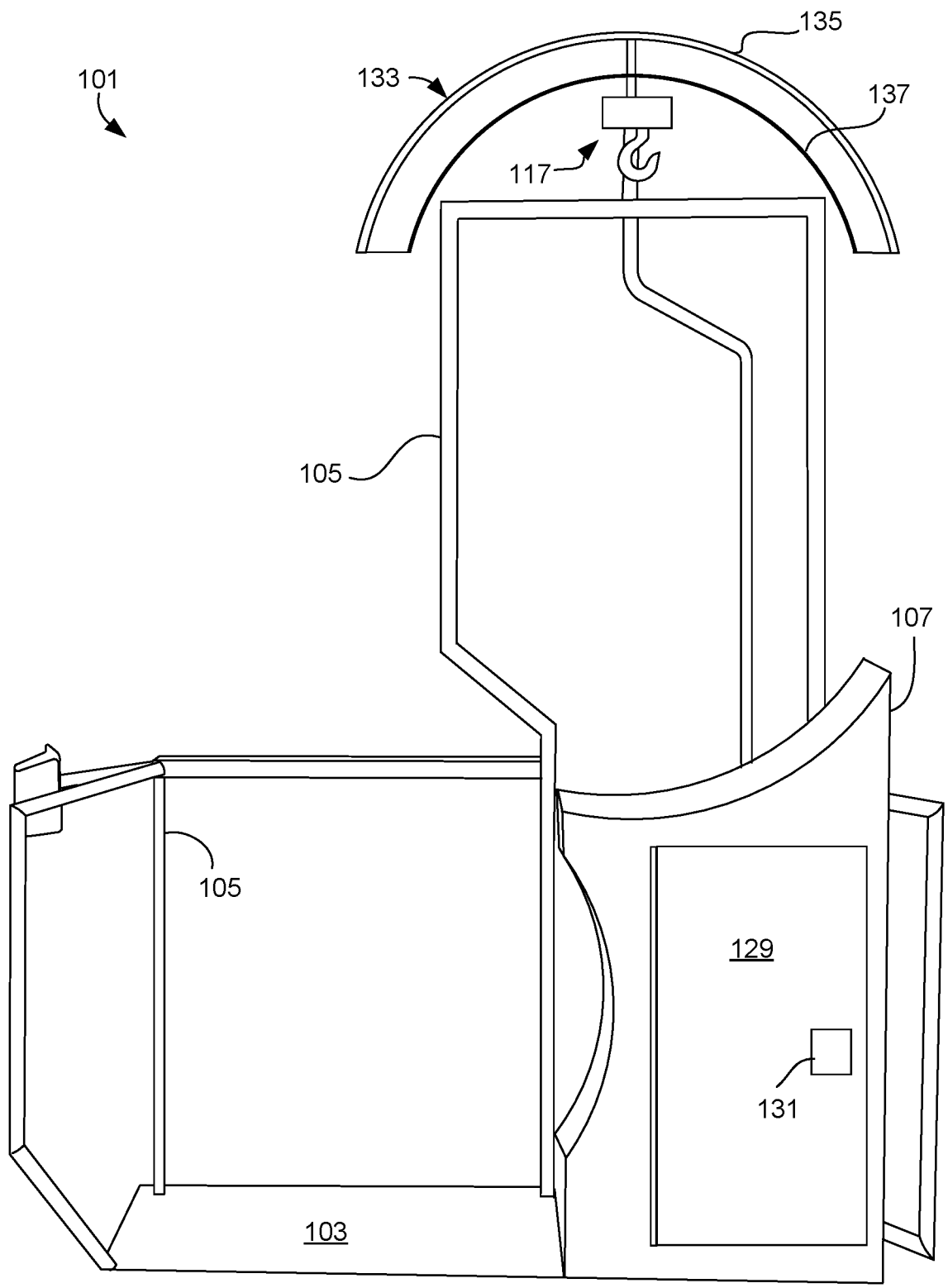
FIG. 5 is an alternate front view of the tire storage device of FIG. 2.

Referring now also to FIG. 5 in the drawings, an alternate front view of device 101 is provided. Device 101 may further include a guard 133 configured to include a rail 135 and a base 137. Hoses from the vehicle may be routed between opposing rails 135 and rest across base 137 to help them avoid abrasive contact with device 101. Guard 133 is coupled to any portion of frame 105. An ideal position is that of being above mechanism 117. This helps to ensure that the hoses stay out of the way if in fact a wheel needs to be removed.

The particular embodiments disclosed above are illustrative only, as the application may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. It is apparent that an application with significant advantages has been described and illustrated. Although the present application is shown in a limited number of forms, it is not limited to just these forms, but is amenable to various changes and modifications without departing from the spirit thereof.

What is claimed is:

1. A tire storage device, comprising:
    a base plate;
    a frame coupled to an upper surface of the base plate;
    a storage container coupled to the upper surface of the base plate; and
    a wheel having a rim and a tire coupled to the frame, the wheel located external to the storage container, the wheel secured in an upright orientation;
    a lifting mechanism coupled to the frame, the lifting mechanism including a tether and motor to facilitate moving the wheel rearward away from the frame, the motor located within the storage container;
    wherein the storage container includes at least one concave surface for acceptance of the wheel; and
    a second wheel held within a second concave surface of the storage container.

2. The device of claim 1, wherein the base plate includes a plurality of fasteners.

3. The device of claim 1, wherein the lifting mechanism further includes a remote to regulate performance of the motor.

4. The device of claim 1, wherein the storage container includes a door and an internal compartment, the door providing access to the internal compartment.

5. The device of claim 1, further comprising a guard coupled to the frame.

6. The device of claim 1, wherein the storage container includes a door and an internal compartment, the door providing access to the internal compartment.

7. A tire storage device for use with a semi-truck, comprising:
    a base plate configured to be mounted to the semi-truck, the base plate including a plurality of fasteners;
    a frame coupled to an upper surface of the base plate;
    a storage container coupled to the upper surface of the base plate; and
    a first wheel and a second wheel in contact with the storage container, the first wheel and second wheel located external to the storage container, the wheels secured in an upright orientation;
    a lifting mechanism coupled to the frame, the lifting mechanism including a tether and motor to facilitate moving the wheel rearward away from the frame, the motor located within the storage container.

8. The device of claim 7, wherein the lifting mechanism further includes a remote to regulate performance of the motor.

9. The device of claim 7, wherein at least one of the first wheel and the second wheel is secured within a concave surface of the storage container.

10. The device of claim 7, wherein the storage container includes a door and an internal compartment, the door providing access to the internal compartment.

11. The device of claim 7, further comprising a guard coupled to the frame.

12. A semi-truck, comprising:
    a cab and a vehicular frame;
    a base plate configured to be mounted to the semi-truck behind the cab, the base plate including a plurality of fasteners;
    a frame coupled to an upper surface of the base plate facing rearward away from the cab;
    a storage container coupled to the upper surface of the base plate and having at least one concave surface, the storage container configured to hold items within an interior;

a wheel having a rim and a tire, the wheel coupled to the frame and nestled into the concave surface of the storage system, the frame having an opening for the wheel on a rearward side;

a lifting mechanism coupled to the frame, the lifting mechanism including a tether and motor to facilitate moving of the wheel to either side of the vehicular frame; and a guard coupled to the frame.

* * * * *